United States Patent
Lee-Own et al.

(10) Patent No.: US 10,142,125 B2
(45) Date of Patent: Nov. 27, 2018

(54) ENERGY HARVESTING FROM A DATA BUS

(71) Applicants: Robert Lee-Own, Asbury Park, NJ (US); Glenn Shevach, Toms River, NJ (US); Mark Blair, Lumberton, NJ (US); Russell Shannon, Ocean Gate, NJ (US)

(72) Inventors: Robert Lee-Own, Asbury Park, NJ (US); Glenn Shevach, Toms River, NJ (US); Mark Blair, Lumberton, NJ (US); Russell Shannon, Ocean Gate, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/431,976

(22) Filed: Feb. 14, 2017

(65) Prior Publication Data

US 2018/0234264 A1 Aug. 16, 2018

(51) Int. Cl.
*H04L 12/40* (2006.01)
(52) U.S. Cl.
CPC ............... *H04L 12/40045* (2013.01)

(58) Field of Classification Search
CPC .................................................. H04L 12/40045
See application file for complete search history.

(56) References Cited

U.S. PATENT DOCUMENTS

2015/0351654 A1* 12/2015 Kilsgaard ............ A61B 5/0478
2018/0077503 A1* 3/2018 Shaquer ............... H04R 25/554

* cited by examiner

*Primary Examiner* — Ronald B Abelson
(74) *Attorney, Agent, or Firm* — Olivia R. Scheuer; NAWCAD

(57) ABSTRACT

A system and method using for energy harvesting from a data bus is provided. A first node of a data bus network is connected to a second node of a data bus network. Each of the first and second nodes transmit and receive data signals. A switching circuit is connected between the first and second node within the data bus network. The switching circuit intercepts data signals transmitted from the first node to the second node. An energy harvesting circuit is connected to the switching circuit. The switching circuit selectively redirects at least a portion of the data signals to the energy harvesting circuit, based on a rule set. A control logic processor is connected to the energy harvesting circuit and the switching circuit. The control logic processor provides the rule set to the switching circuit based on feedback from the energy harvesting circuit and the switching circuit.

14 Claims, 2 Drawing Sheets

ENERGY HARVESTING FROM A DATA BUS

STATEMENT OF GOVERNMENT INTEREST

The invention described herein may be manufactured and used by or for the Government of the United States of America for governmental purposes without payment of any royalties thereon or therefor.

BACKGROUND

Energy harvesting is a key development in the deployment of self-sustaining systems. Energy harvesting is the process of deriving, capturing, and utilizing energy from a system environment, rather than a power source, such as a battery or traditional power supply. Some of the most popular energy harvesting schemes include piezoelectric crystals (i.e., generating a small voltage when the crystal is mechanically deformed during vibration), photovoltaic cells (i.e., converting solar energy into voltage), thermoelectric generators (i.e., producing a voltage from a temperature gradient), and inductive coupling (i.e., making use of specialized antennae to capture the energy contained in electromagnetic fields). Electronics implemented and powered solely using these methods are often self-sustaining, requiring no additional power source.

In many instances, energy harvesting is used to provide a small amount of power for low-energy electronics. While the energy to power some large-scale electronics from oil and coal resources is costly, the source of energy used in energy harvesting devices is generally present as ambient background, and is therefore free. For example, piezoelectric energy harvesting systems in bridges can be powered by vibrations in the structure caused by traffic and used for structural health monitoring.

SUMMARY

In general, in one aspect, a system for harvesting energy from a data signal includes a first node of a data bus network connected to a second node of the data bus network, wherein the first node and the second node each transmit and receive a plurality of data signals; a switching circuit operatively connected between the first node and the second node, wherein the switching circuit intercepts the plurality of data signals transmitted by the first node to the second node and from the second node to the first node; an energy harvesting circuit operatively connected to the switching circuit, wherein the switching circuit selectively redirects one or more of the plurality of data signals to the energy harvesting circuit; and a control logic processor operatively connected to the energy harvesting circuit and the switching circuit.

In general, in another aspect, a method for harvesting energy from a data bus includes receiving, by a switching circuit, a plurality of data signals, wherein the plurality of data signals are transmitted by a first node of a data bus in a network environment; receiving, by the switching circuit, a rule set from a control logic processor; transmitting, by the switching circuit, at least one data signal of the plurality of data signals to a second node of the data bus in a network environment; and transmitting, by a switching circuit, one or more data signals of the plurality of data signals to an energy harvesting circuit, wherein the one or more data signals transmitted to the energy harvesting circuit are determined by a rule set, and wherein the energy harvesting circuit converts the one or more data signals into electrical energy.

Unless otherwise defined, all technical and scientific terms used herein have the same meaning as commonly understood by one of ordinary skill in the art to which this invention belongs. Other features and advantages will be apparent from the following detailed description.

DRAWINGS

These and other features, aspects and advantages of the present invention will become better understood with reference to the following description and appended claims, and accompanying drawings wherein:

DETAILED DESCRIPTION

Figure 1:
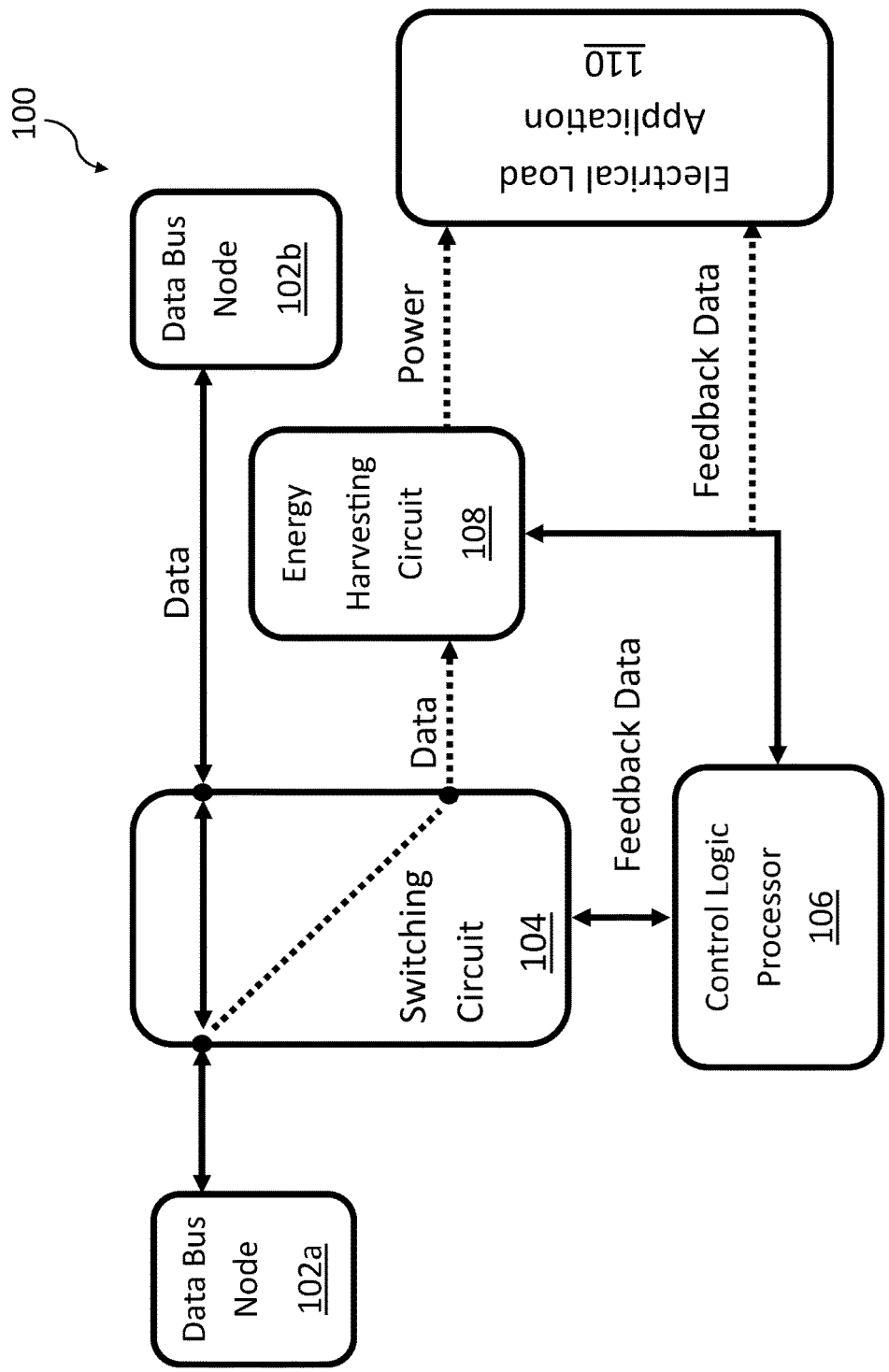
FIG. 1 is a block diagram of the energy harvesting system.

Embodiments of the present invention acknowledge a growing need for energy in electronic environments, especially networking environments. As the number and complexity of electronics increase, as they have consistently for several decades, the need for energy also increases. Further, there has been a global push to make energy consumption cleaner and more efficient. One industry answer for increased energy efficiency is energy harvesting. Previously energy harvesting has primarily been through solar, thermal, wind, salinity, and kinetic sources. Embodiments of the present invention harvest energy from data signals sent through a data bus.

Embodiments of the present invention use existing data communications infrastructure to generate usable energy. In many instances communications infrastructure systems must be robust against error. A variety of error detection and correction methods are in place in popular data buses, including but not limited to checksums, parity bits, and cyclic redundancy checks (CRC) for error detection and forward error correction and redundancy for error correction. Data transmission errors that may be introduced on the data bus, via the methods of the present invention, would be identical to the errors designed to be detected and corrected by the state of the art in error detection and correction methods. One advantage of the present invention is that harvested energy can provide power to other applications, such as embedded diagnostics, without the need for an additional power infrastructure.

In many instances, communications infrastructure systems are made robust against error through redundancy of data signals. This redundancy has two resulting developments. First, communications methods are infrequently taxed beyond the point at which they can recover data. Second, extra energy is used to form the redundant signals; signals that are not always required. Often, the electrical specifications of a data bus will specify the required minimum transmit and receive characteristics for the receiving data bus to interpret the data properly. Further, other characteristics such as rise and fall time, noise, and any deviation from a perfect modulation wave. Minimum transmit and receive characteristics are in place due to the expectation that the signal will degrade during transmission. Real-word factors such as length of the wire, number of connections and junctions, and possible interference cause degradation. Embodiments of the present invention exploit the difference between what is transmitted and what is required at the receiver.

Embodiments of the present invention harvest the excess energy from the data lines, which can be used to operate small, embedded systems. In some embodiments, energy harvested using the present invention can be stored to create a low voltage DC power source. In other embodiments, the harvested energy can be provided to power components which perform diagnostics on wired communication systems.

Embodiments of the present invention selectively break the physical layer of a data/communications bus. At least a portion of the data signal is redirected to an energy harvester to be converted to electrical energy. In the subsequent invention description, a data signal may include one or more data packets. Harvested energy can be used, stored, or transferred to another system.

In the following description of the present invention, reference will be made to various embodiments which are not all inclusive. The current invention can be implemented using various forms of software and hardware. However, example embodiments of the present invention are described below and illustrated in FIGS. 1 and 2.

Embodiments of the present invention harvest energy from a data signal, to be used or stored in another system. Embodiments of the present invention are employed in hardwired communications systems. For example, a system in which a data signal is transmitted from one node to another through a physical connection (e.g., copper wire).

FIG. 1 is an environment diagram of energy harvesting system 100. In some embodiments, energy harvesting system 100 is part of a networking environment. One or more energy harvesting systems 100 may be present in the networking environment. Energy harvesting system 100 comprises data bus nodes 102a and 102b, switching circuit 104, processor 106, harvesting circuit 108, and electrical load application 110.

Data bus nodes 102a and 102b are within the same communications system. For ease of explanation, examples will be given with data bus node 102a transmitting data signals to data bus node 102b. However, data bus node 102a is capable of sending and receiving data signals to/from multiple data bus nodes, including data bus node 102b; conversely, data bus node 102b is capable of sending and receiving data signals from multiple data bus nodes, including data bus node 102a. In some embodiments, data bus node 102a transmits multiple data packets to data bus node 102b, to ensure data integrity.

Switching circuit 104 is connected in-line between data bus node 102a and data bus node 102b. Switching circuit 104 selectively redirects data signals transmitted by data bus node 102a to either data bus node 102b or harvesting circuit 108, based on predetermined conditions. Switching circuit 104 can be controlled by either a computer with specially programmed software or a processor. For ease of explanation, the present invention is described using an embodiment comprising a control logic processor, e.g., processor 106.

Processor 106 establishes the predetermined conditions, which switching circuit 104 uses to redirect the data signals. In embodiments using a computer with specially programmed software, one example of the special programmed software is a custom LabVIEW virtual instrument with a data acquisition system.

In some embodiments, processor 106 communicates with switching circuit 104 through a pulse width modulated signal. The signal controls whether the switch is naturally allowing the data to pass between network nodes or directing the signal to harvesting circuit 108. In many embodiments, a data bus contains multiple data lines (e.g., 10/100 mbps Ethernet having four lines, or gigabit Ethernet having eight lines, etc.). In some embodiments, control logic from processor 106 directs switching circuit 104 to operate on one or more of the data lines. Therefore, each data line within a data bus will have two states within switching circuit 104, transmit and receive over the data bus or harvest from the data bus.

In some embodiments, processor 106 receives feedback from switching circuit 104 and harvesting circuit 108. For example, using operating condition and error reports from switching circuit 104 and harvesting circuit 108, processor 106 can tune efficiency, total power, phasing, and timing through modifications to the control logic.

In some embodiments, processor 106 also provides control logic to electrical load application 110. For example, processor 106 can turn electrical load application 110 on, off, or throttle operation. In some embodiments, processor 106 receives feedback from electrical load application 110, which processor 106 uses to alter control logic sent to switch circuit 104. For example, if electrical load application 110 is a battery, processor 106 could operate switching circuit 104 and harvesting circuit 108 to allow power to flow to the battery, causing it to charge. Electrical load application 110 can provide feedback to processor 106, such as when the battery is at capacity. In response, processor 106 could alter control logic to switching circuit 104, allowing data flow naturally from data bus node 102a to data bus node 102b.

Harvesting circuit 108 is a voltage rectification architecture. In some embodiments, harvesting circuit 108 is a full bridge rectifier comprising diodes and capacitors. In other embodiments, harvesting circuit is a battery charging integrated circuits (IC). In another embodiment, harvesting circuit 108 is a commercial off-the-shelf (COTS) IC. Other embodiments are possible to achieve the rectification of the electrical energy.

Electrical load application 110 can be either an energy storage device (i.e., a battery) or a component of the communications network. For example, in some embodiments, electrical load application is an embedded diagnostic that operates on the harvested energy, without the need for an additional power source.

Figure 2:
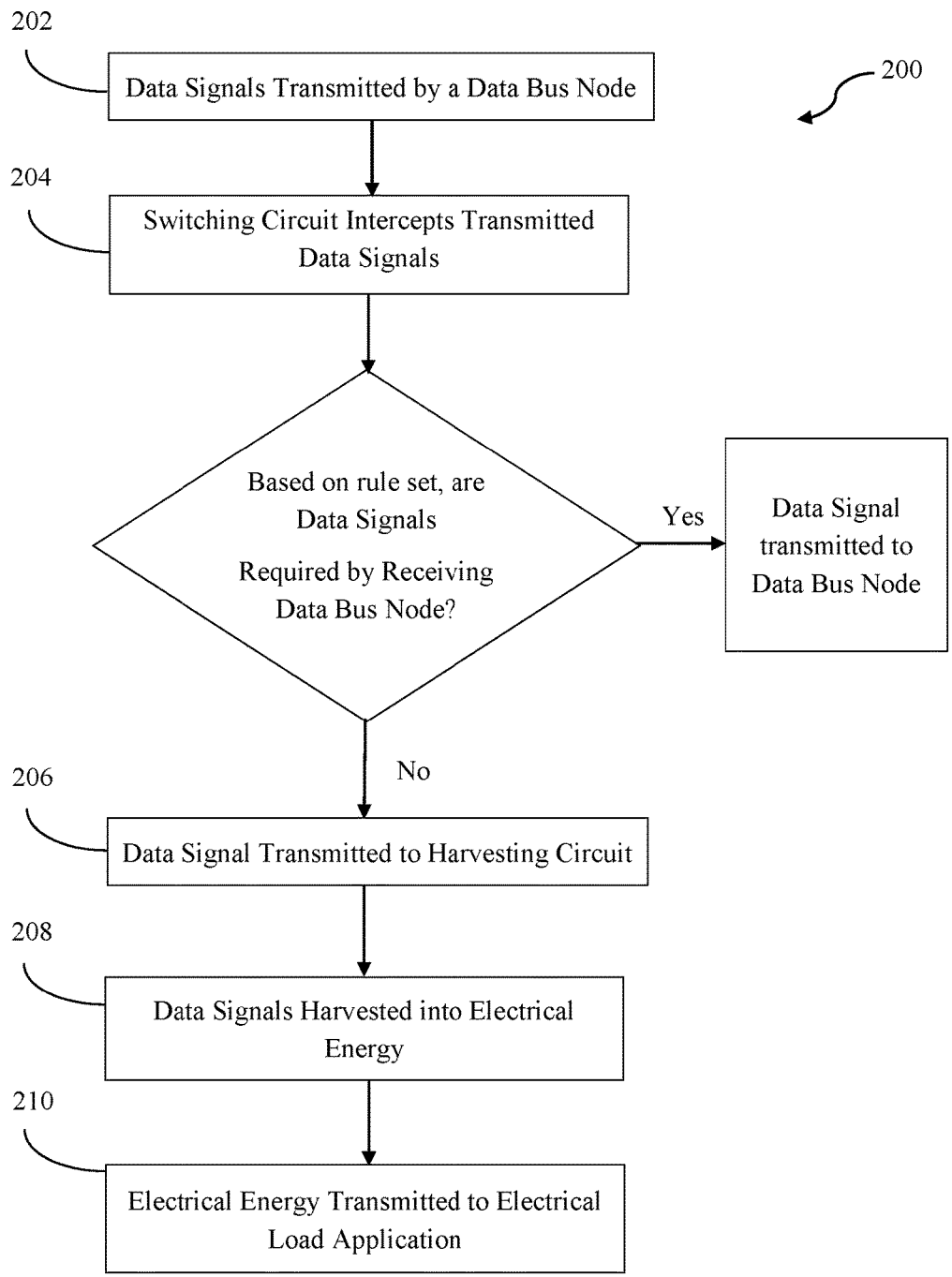
FIG. 2 is a block diagram of the method steps of an embodiment of the energy harvesting system.

Turning now to FIG. 2, the method (200) of harvesting energy using energy harvesting system 100 is described. One skilled in the art will recognize that functions described in the block diagram may occur out of the order noted in FIG. 2. For example, two blocks shown in succession may, if fact, be executed substantially concurrently, depending upon the functionality involved.

In step 202, data signals are transmitted by data bus node 102a within a network environment. The transmitted data signals are directed to data bus node 102b. In some embodiments, the data signals include multiple iterations of a single data package. Multiple iterations can be used to increase the integrity of data delivery. However, in many embodiments, multiple iterations of the data package are not needed and the excess data signals go unused. In another embodiment, the data signals include multiple data packets comprising a variety of information. In some instances, data bus node 102b can recreate information in a missing data packet, based on information provided in received data packets.

In step 204, the transmitted data signals are received by switching circuit 104 of energy harvesting apparatus 100. Switching circuit 104 is capable of transmitting the received signals to either data bus node 102b or harvesting circuit 108. Where signals are transmitted to data bus node 102b, the data signals are received by data bus node 102b in the normal course of network functionality. Where signals are transmitted to harvesting circuit 108, data bus node 102b does not receive the data enclosed in the packet.

In step 206, switching circuit 104 transmits a portion of the data signals to harvesting circuit 108. Switching circuit 104 determines the transmission path of each data signal based on rules provided by processor 106. In some embodiments, processor 106 determines the switching path based on timing. For example, processor 106 can provide instructions to switch the data signal transmission to harvesting circuit 108 every 10 milliseconds (ms) out of every 50 ms In some embodiments, the timing is determined based on transmission characteristics of data bus node 102a. In another embodiment, processor 106 determines the switching path based on characteristic of a data package. For example, processor 106 reads the header of each data package to determine the importance or key characteristics of the data package. In one example, processor 106 provides instructions to transmit duplicative signals to harvesting circuit 108, i.e., the first iteration of a data package is sent to data bus node 102b and all other iterations of the data package are sent to harvesting circuit 108. In another example, processor 106 provides instructions to switch transmission based on key data packet characteristics. In this example, handshake and status packets (e.g., ACK [acknowledge], NAK [no acknowledgement], etc.) may be transmitted to harvesting circuit 108, whereas packets containing data words are transmitted to data bus node 102b. In yet another embodiment, processor 106 determines the switching path based on a user-initiated command. In still another embodiment, processor 106 determines the switching path based on the status of electrical load application 110. For example, where electrical load application 110 is a battery at capacity, processor 106 provides instructions to transmit all data signals to data bus node 102b.

In step 208, harvesting circuit 108 receives the transmitted signals (step 206) and harvests energy. Harvesting circuit 108 performs basic signal manipulation, such as rectification, that permits energy to be harvested from the data signal. In some embodiments, the harvesting circuit relays information back to processor 106.

In step 210, harvesting circuit 108 transmits energy to electrical load application 110. In some embodiments, electrical load application 110 is a storage device. In these embodiments, the energy is stored for use at a later time. In another embodiment, the energy is directed to a specific component. In this embodiment, one or more low-power components in the network environment (e.g., autonomous devices) are powered using the energy harvested in step 208.

The above description is that of current embodiments of the invention. Various alterations and changes can be made without departing from the spirit and broader aspects of the invention as defined in the appended claims.

What is claimed is:

1. An energy harvesting system, the system comprising:
a first node of a data bus network connected to a second node of the data bus network, wherein the first node and the second node each transmit and receive a plurality of data packets;
a switching circuit operatively connected between the first node and the second node, wherein the switching circuit intercepts the plurality of data packets transmitted by the first node to the second node, wherein the plurality of data packets comprises a duplicative signal having a first iteration of the data packets and at least a second iteration of the data packets;
an energy harvesting circuit operatively connected to the switching circuit, wherein the switching circuit transmits the first iteration of the data packets to the second node and redirects at least the second iteration of the data packets to the energy harvesting circuit, wherein the energy harvesting circuit converts at least the second iteration of the data packets into electrical energy; and
a control logic processor operatively connected to the energy harvesting circuit and the switching circuit.

2. The system of claim 1, further comprising:
an electric load storage operatively connected to the energy harvesting circuit, wherein the electric load storage stores the electrical energy.

3. The system of claim 2, further comprising:
an electric load application operatively connected to the energy harvesting circuit, wherein the electric load application utilizes the electrical energy.

4. The system of claim 1, wherein the control logic processor transmits one or more rules to the switching circuit, wherein the switching circuit transmits the one or more data packets to energy harvesting circuit based on the one or more rules.

5. The system of claim 4, wherein the control logic processor determines the one or more rules based on feedback from at least one of: the switching circuit, the energy harvesting circuit, and an electrical load.

6. A method for harvesting energy from a data bus, the method comprising:
receiving, by a switching circuit, a plurality of data signals, wherein the plurality of data packets comprise a duplicative signal having a first iteration of the data packets and at least a second iteration of the data packets, and wherein the plurality of data packets are transmitted by a first node of a data bus in a network environment;
receiving, by the switching circuit, a rule set from a control logic processor;
transmitting, by the switching circuit, the first iteration of the data packets to a second node of the data bus in the network environment; and
transmitting, by a switching circuit, at least the second iteration of the data packets to an energy harvesting circuit, wherein transmission of at least the second iteration of the data packets, to the energy harvesting circuit is determined by a rule set, and wherein the energy harvesting circuit converts at least the second iteration of the data packets into electrical energy.

7. The method of claim 6, wherein the electrical energy is transmitted to an al component embedded in the network environment.

8. The method of claim 6, wherein the electrical energy is transmitted to an electrical load storage.

9. The method of claim 6, wherein the logic control processor receives feedback from the energy harvesting circuit, and wherein the logic control processor creates the rule set based on the feedback.

10. The method of claim 9, wherein the feedback comprises data on at least one of: total energy harvested, phasing, and timing.

11. The method of claim 6, wherein the logic control processor receives feedback from the switching circuit, and wherein the logic control processor creates the rule set based on the feedback.

12. The method of claim 11, wherein the feedback comprises data on at least one of: one or more properties of the plurality of data packets and timing.

13. The method of claim 7, wherein the logic control processor receives feedback from the electrical component, and wherein the logic control processor creates the rule set based on the feedback.

14. The method of claim 8, wherein the logic control processor receives feedback from the electrical load storage, and wherein the logic control processor creates the rule set based on the feedback.

* * * * *